United States Patent [19]

Pertl et al.

[11] 4,128,874

[45] Dec. 5, 1978

[54] METHOD AND APPARATUS FOR PREVENTING ERRONEOUS DATA TRANSFER FROM A DIGITAL COMPUTER

[75] Inventors: Jerry H. Pertl, Bloomington; Howard A. Koehler, Minneapolis, both of Minn.

[73] Assignee: Sperry Rand Corporation, New York, N.Y.

[21] Appl. No.: 840,699

[22] Filed: Oct. 11, 1977

Related U.S. Application Data

[63] Continuation-in-part of Ser. No. 686,977, May 17, 1976, abandoned.

[51] Int. Cl.² .............................................. G06F 11/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 3,508,205 | 4/1970 | Kubie | 364/200 |
| 3,806,882 | 4/1974 | Clarke | 364/200 |
| 3,825,903 | 7/1974 | Brown | 364/200 |
| 3,893,084 | 7/1975 | Kotok et al. | 364/200 |

*Primary Examiner*—Harvey E. Springborn
*Attorney, Agent, or Firm*—William D. Bauer; Kenneth T. Grace; Marshall M. Truex

[57] ABSTRACT

This invention relates to an apparatus and method for preventing a digital computer from erroneously outputting data contained in an output word to another digital computer or peripheral device. A portion of the output word is allocated as a key field which must be matched with a predetermined lock value before the digital computer will allow an output of the data field of the output word to occur. That is, a key value specified as part of the output word must match a predetermined lock value before an output transfer of the data field of the output word is allowed to take place. If the lock value and key value do not match, the central processor section of the digital computer is interrupted. This apparatus and method not only verifies the correct operation of the digital computer output data transfer hardware by preventing an erroneous transfer of the data field of the output word but also alerts the central processor section in the event of a mismatch by means of an interrupt.

8 Claims, 6 Drawing Figures

METHOD AND APPARATUS FOR PREVENTING ERRONEOUS DATA TRANSFER FROM A DIGITAL COMPUTER

GOVERNMENT CONTRACT

The invention herein described was made in the course of or under a contract or subcontract thereunder, with the Department of Defense.

RELATED APPLICATIONS

This application is a Continuation-In-Part of a U.S. Pat. Application, now abandoned, entitled Method and Apparatus for Preventing Erroneous Data Output in Digital Data Processing Equipment, invented by Jerry Hudson Pertl and Howard Arthur Koehler, Ser. No. 686,977, and filed on May 17, 1976. The present application claims priority to May 17, 1976 for material disclosed in the parent application.

BACKGROUND OF THE INVENTION

In a security conscious digital computer environment, measures must be taken to ensure that sensitive data is not transferred or allowed to be accessed unless specifically authorized. One of the problems in constructing such an environment is the possibility of a hardware failure in the digital computer assigned the responsibility for maintaining the security of the sensitive data. For example, in a digital computer whose output is controlled by a buffer control word which specifies not only the starting address of the data to be transferred but also the number of words to be transferred, a failure in the loading of the number of words to be transferred could cause more output words to be outputted than was anticipated by the software. This undesirable situation, caused by hardware malfunction, could result in the leaking of sensitive data.

However, if the software is required to insert a certain code pattern or value as determined by a number of key bits in the output words and the digital computer hardware makes a check of the certain code pattern before an output transfer is allowed to take place, the odds of an erroneous output of sensitive data will be greatly diminished. In the example previously given, a failure in the loading of the buffer control word count causing an attempted transfer of a greater number of output words than was desired would not result in an erroneous transfer if the key value as determined the key bits in the output words do not match the predetermined lock value, since the hardware comparison apparatus would detect the mismatch, prevent the erroneous output transfer and alert the central processor section of the digital computer that a mismatch has occurred.

SUMMARY OF THE INVENTION

The present invention provides a method and apparatus for protecting against the erroneous transfer of a data field contained in an output word from a digital computer. This is accomplished by comparing a predetermined lock value with a key value contained in a key field of the output word. The comparison means indicates either a first or a second condition depending upon the comparison of the lock value and the key value. The transfer of the data field of the output word is inhibited when the comparison indicates the first condition but the transfer of the data field of the output word is allowed when the comparison indicates the second condition.

BRIEF DESCRIPTION OF THE DRAWINGS

The foregoing advantages, construction and operation of the present invention will become more readily apparent from the following description and accompanying drawings in which.

DESCRIPTION OF THE PREFERRED EMBODIMENT

In order to protect specific data in a security conscious digital computer environment, provisions have been made as a result of the present invention to incorporate hardware apparatus for checking the proprietary of outputting the data field of each output word before that data field is sent to the output data lines of the digital computer. A portion of the output word to be outputted is allocated as a key field which is independent of the rest of the output word which is a data field consisting of data bits. This key field represents a key value than can be checked against a predetermined lock value. If the key value specified by the key field of the output word and the lock value match, then the input/output section of the digital computer can proceed to transfer the data field of the output word to the output data lines of the digital computer. However, if the key value and lock value do not match, the data field of the output word cannot be sent to the output data lines of the digital computer and the central processor section of the digital computer would be alerted via an interrupt. The software of the digital computer can control which output words would be available for output by controlling the key value in the key field of each and every output word in the memory of the digital computer, or in as many sensitive output words as is desired. Since the value of the lock value has been predetermined, the programmer, via the software, can either set the value of the key fields of the output words to the lock value or not depending upon whether or not the programmer wants to allow the data fields that are contained in the output words to be available for transfer from the digital computer.

Figure 1:
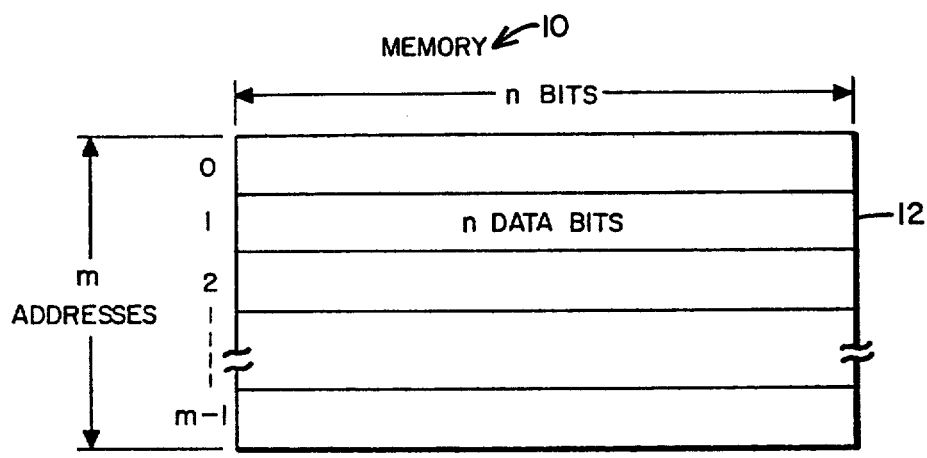
FIG. 1 is a schematic representation of a portion of the memory of the digital computer which illustrates the origin of the output word to be outputted in a digital computer not incorporating the present invention.
Figure 2:
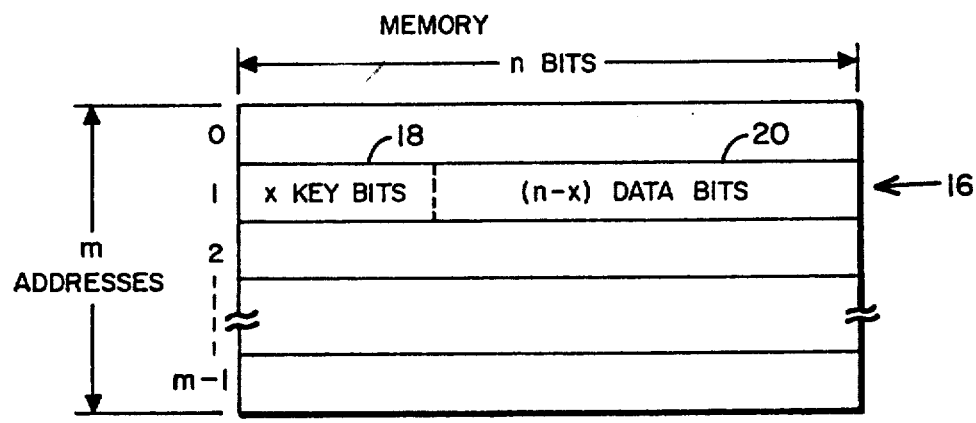
FIG. 2 is a schematic representation of a portion of the memory of the digital computer which illustrates the origin of the output word to be compatible with the present invention.

FIG. 1 illustrates a typical prior art output word as it exists in the memory of a digital computer prior to output transfer intitiation. This schematic representation shows a portion of the digital computer's memory 10 showing the number of output words in the vertical dimension from address 0 through address m-1 and the number of data bits in the horizontal direction, there being $n$ bits in each output word. For purposes of illustration, the output word at memory address 1 can be assumed to be a particular output word which is to be transferred from the digital computer. This prior art output word 12 consists purely of data, i.e., all $n$ bits of the output word 12 comprise information or data which is to be transferred from the digital computer. Contrasted with this is the output word 16 in FIG. 2 which illustrates that the output word has been broken into two fields. The first, termed the key field 18 contains a key value which will be operated on by a hardware comparator as will subsequently be described. The second field, termed the data field 20 consists of the remaining data bits in the output word 16. The data field 20 of the output word 16 and only the data field 20 will be utilized as data in the output transfer from the digital computer should the key field 18 of the output word 16 permit.

The key field 18 of the output word 16 can be any size desired less than $n$ bits, the total number of bits in the output word 16. The key field 18 is illustrated in this figure as containing $x$ bits. The larger value for $x$, that is the larger the number of bits utilized in the key field 18 of the output word 16, the fewer bits that are left for utilization in the data field 20 of the output word 16. The greater the value of $x$ as utilized in the key field 18 of the output word 16, the less likely that an accidental match of the value contained in the key field 18 to the predetermined lock value would occur in the event of a hardware failure. However, the larger the value of $x$, the fewer bits, i.e., $n$ minux $x$ bits, will remain to be available for information carrying data bits for the data field 20 of the output word 16. Thus, a tradeoff exists based upon the characteristics of the digital computer requirements.

Now that the output word 16 has been defined and partitioned into a key field 18 and a data field 20, reference will be made to the particular hardware apparatus that is to perform the matching or comparison function of the present invention and how the partitioning of the output word 16 into its key field 18 and a data field 20 cooperates therewith.

Figure 3:
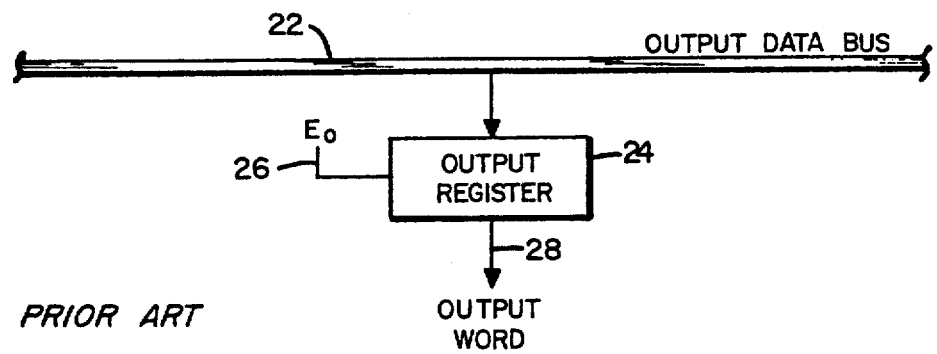
FIG. 3 is a schematic representation of the input/output section of a digital computer which does not incorporate the present invention.

FIG. 3 shows by schematic representation the output data transfer path of a digital computer. This figure shows an output data bus 22 through which data must pass before it is outputted from the digital computer. The channel output register 24 is loaded directly from the output data bus 22 upon the occurrence of a load channel output register command enable signal $E_0$ on line 26. The data contained in the channel output register 24 represents the data which is to be transferred from the digital computer. This data travels over the output cable 28 to the digital computer's output data lines (not illustrated) or other mechanism for final passage from the digital computer. This representation is a simple schematic illustration of how a digital computer might transfer its output words. Such a prior art digital computer is presented here for purposes of illustration and for setting the environment into which the present invention can be incorporated. Of course, many other output data transfer paths are envisaged and from the subsequent explanation and description, one with ordinary skill in the art would be able to incorporate the present invention into the output data transfer path of other or similar digital computers.

Figure 4:
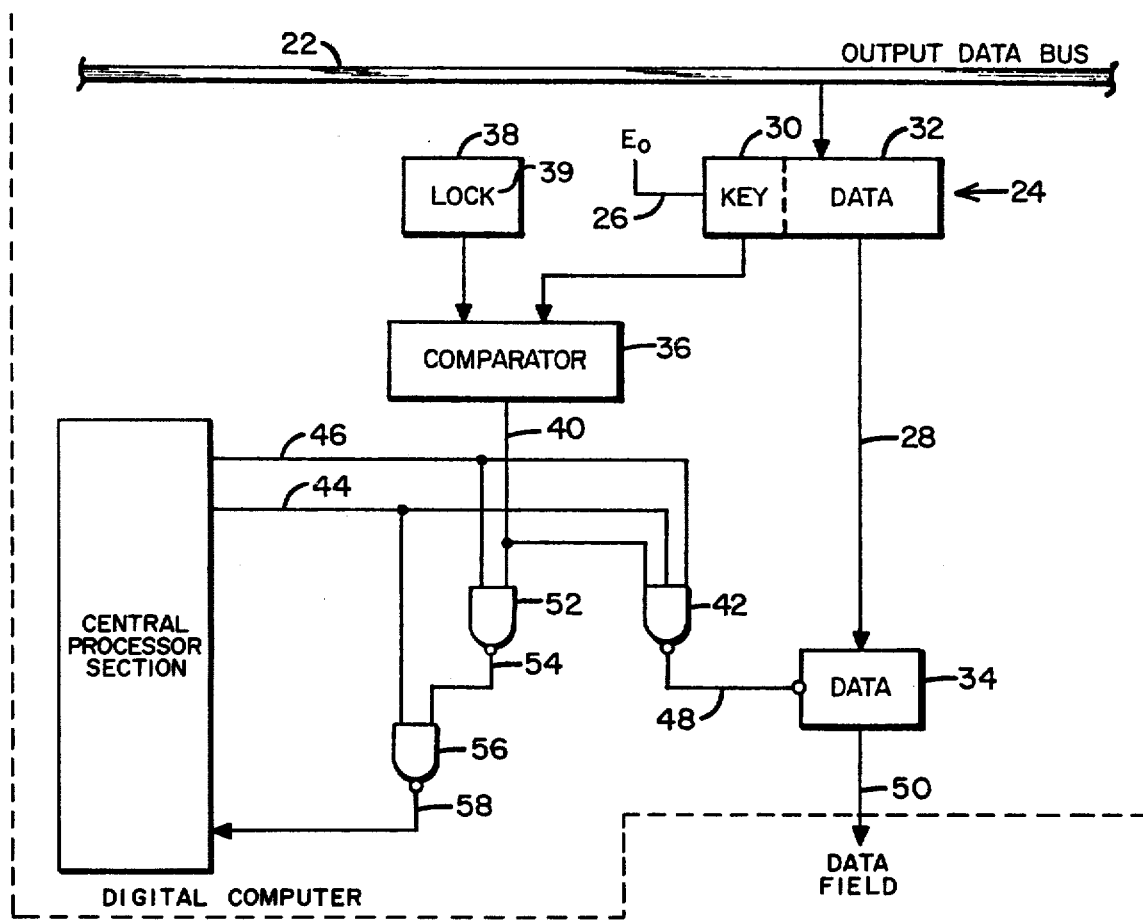
FIG. 4 is the input/output section of the same digital computer giving a schematic representation of the present invention and its interconnection with the digital computer.

FIG. 4 is a schematic representation of the same output data transfer path of the same digital computer described in FIG. 3. However, in FIG. 4 the apparatus required to incorporate the present invention is also schematically illustrated. The same output data bus 22 is shown loading the channel output register 24 by means of the load channel output register command enable signal $E_0$ on line 26.

During the course of the digital computer's output data transfer path, the output word is loaded into the channel output register 24. The output word, of course, as previously described, consists of a key field and a data field. This is illustrated in the channel output register 24 by dashed line with the key field 30 to the left of the dashed line and the data field 32 to the right of the dashed line.

As illustrated in FIG. 4, instead of connecting the entire portion of the channel output register 24 to the output data lines of the digital computer as shown in the prior art system illustrated in FIG. 3, only the data field 32 of the channel output register 24 is transferred via the data path 28. But instead of being coupled directly to the output data lines (not shown) the data is instead coupled to the input of another data output register 34. The remaining portion of the channel output register 24, i.e., the key field 30, comprises one parallel input to a comparator 36. The other input to the comparator 36 comes from the hardware lock network 38 in which is stored a lock value 39. This hardware lock network 38 may take various forms including that of a register, but the simplest form and that form preferred is just simply a series of hardwired high and low binary signals for each of the $x$ bits in the lock value. This lock value 39 may be obtained simply by connecting each line desired to carry a high signal to a positive voltage through a resistive element, or on the contrary tying each line desired to carry a low signal directly to ground. The comparator 36 may consist of any of the integrated circuit, medium scale integration, comparator circuits widely available on the market. An example of such a circuit is the Fairchild integrated circuit Model No. 9324 as described in The Fairchild Semiconductor TTL Data Book, June 1972. The comparator 36 will compare the key field 30 of the word in the channel output register 24 with the lock value 39 and determine whether a match exists. If a match exists the output of the comparator on line 40 will be a high. This information on line 40 is one of the inputs to a NAND circuit 42 along with the timing signal 44 and a discrete enable signal 46. The presence of a high on each of these signal lines 40, 44 and 46 will cause signal line 48, the output of NAND circuit 42, to go low and will enable the loading of the data output register 34 with the data field 32 of the information contained in the channel output register 24. With the data information in the data output register 34, the data is available for transfer from within the digital computer to the digital computer's output data lines (not illustrated) via communication lines 50. Should the comparator circuit 36, however, indicate a mismatch between the key value contained in the key field 30 and the lock value 39, the output 40 of the comparator 36 would be a low disabling NAND circuit 42 causing a high on signal line 48 and preventing the loading of the data field 32 into the data output register 34.

Figure 5:
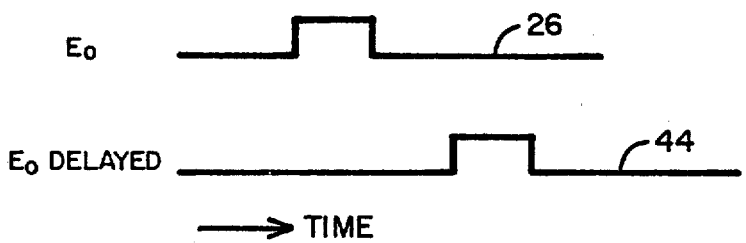
FIG. 5 is an illustration of the time sequence of two of the timing pulses utilized in the present invention; and, FIG. 6 is a schematic flow chart representation of the method for performing the present invention.

The discrete enable line 46 is available as an input to NAND circuit 42 for the sole purpose of disabling the results of the comparison function and absolutely preventing the loading of the data output register 34 and thereby preventing all output transfers. The discrete enable line 46 originates in the central processor section of the digital computer (not illustrated) and may be set or cleared as the software dictates. The timing signal 44 merely represents a means for enabling the gating of the data into the data output register 34 at a time when the data is available in the channel output register 24, but sufficiently after the channel output register 24 was loaded so that a proper compare function may be obtained. A relationship of the timing pulses "EO" and "EO Delayed" may be had by reference to FIG. 5. Here, with time increasing from left to right in the diagram, it can be seen that "EO", that is the load channel output register command enable signal applied to line 26, occurs earlier in time than the "EO Delayed", timing signal 44. The time from which the EO signal line 26 is disabled until "EO Delayed" applied to line 44 is enabled is the minimum time required for the comparison and other circuit delays, including data stabilization time, to occur but is not so unreasonably long as to allow the information contained in the channel output register 24 to become invalid. The relationship of the timing pulses in FIG. 5 therefore is only relatively exemplary.

The output 40 of the comparator 36, the discrete enable on line 46 and the timing signal on line 44 are also utilized in another capacity of the apparatus shown in FIG. 4. First of all, the output 40 of the comparator 36 and the discrete enable signal on line 46 are normally low level inputs to NAND circuit 52, utilized as a low-level logical OR circuit. Thus, as previously stated, when the comparator determines that a mismatch exists the output 40 of the comparator 36 will be at a low level which will enable the low-level OR circuit 52 and create a high on its output 54. Similarly, whenever the discrete enable signal on line 46 is low, preventing a transfer of data from the computer by disabling NAND circuit 42, the low level OR circuit 52 will be activated and a high will occur on its output 54. Along with the timing signal on line 44, the output 54 of the low-level OR circuit 52 are inputs to another NAND circuit 56. With highs on both its inputs, the NAND circuit 56 will be activated and will cause, via a low at its output, an interrupt to be generated on signal line 58 which is then sent to the central processor section of the digital computer for further processing by the software. If instead, the discrete enable line 46 is high, allowing a potential data output transfer to occur, and a match between the key value 30 and the lock value 38 has occurred, the output 40 of the comparator 36 will be high causing a low on signal line 54, thereby disabling NAND circuit 56 causing signal line 58 to go high and disabling the sending of an interrupt to the central processor section.

Thus, from the preceding description, it can be seen that when the key value 30 and the lock value 39 match, the interrupt to the central processor section is disabled and data is allowed to be transferred into the data output register 34 and further to be transferred from the digital computer via data lines 50. It also can be seen that when a mismatch occurs between the key value 30 and the lock value 39 that data will not be allowed to be transferred from the channel output register 24 to the data output register 34 and, thus, data will be prevented from being transferred from the digital computer via communications lines 50. Further, when a mismatch occurs, an interrupt will be generated to alert the central processor section that a hardware malfunction has occurred.

The discrete enable line 46 is available for many purposes including that of testing the proper operaton of the circuitry involved in the present invention. That is, by setting the discrete enable line high, the normal operation and function of the circuitry of the present invention is allowed. However, when setting the discrete enable line 46 in a low state, the normal comparison function is inhibited and an interrupt is generated which is sent to the central processor section whenever the timing signal 44 occurs.

Figure 6:
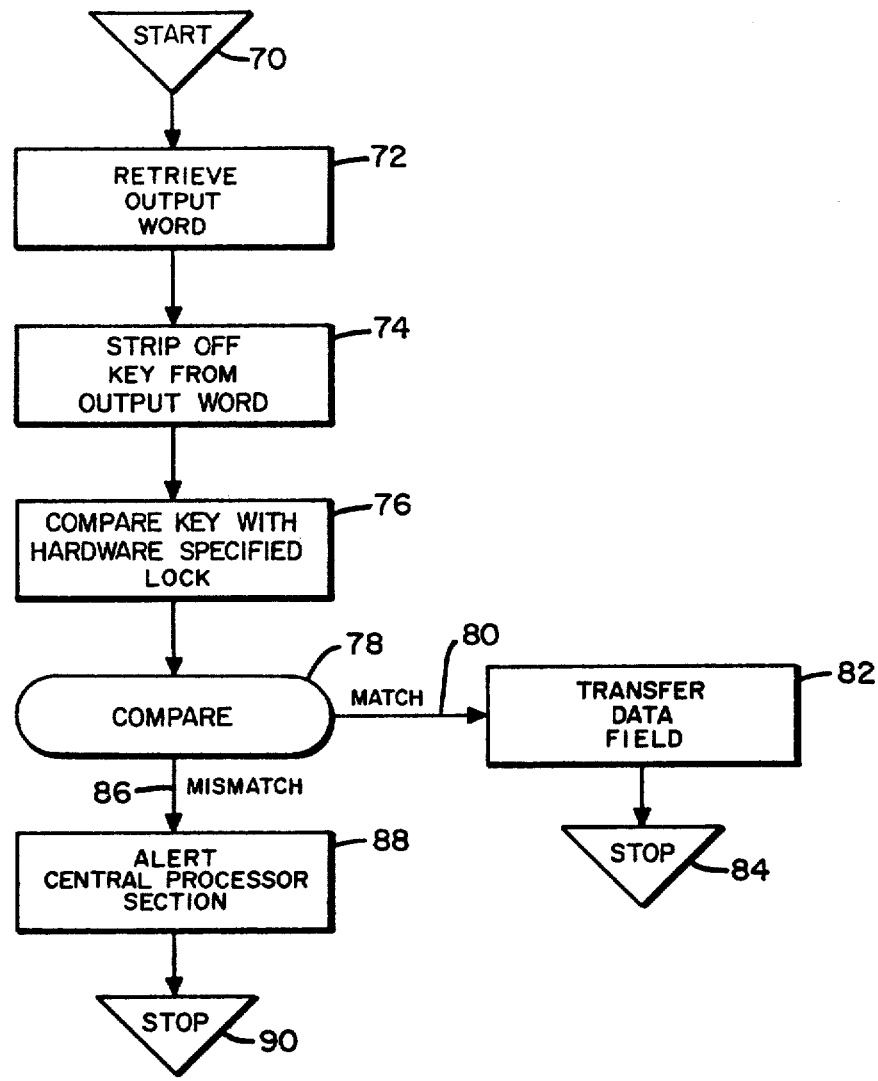

The method of performing the foregoing function can be better illustrated by reference to the flow diagram of FIG. 6. Starting in block 70 and proceeding to block 72, the first operation is to retrieve the output word from the memory of the digital computer. This takes place in a conventional fashion during the digital computer's normal output data transfer path process procedures. However, before allowing the output word to be tranferred to the digital computer output lines, first as represented by block 74, the key field of the output word is stripped off. Then, in block 76, a key value represented by the key field of this output word is compared with the hardware specified lock value. Should the result of that comparison represented by block 78 be a match, the process proceeds along path 80 to the block 82 where the data field of the output word is outputted from the digital computer and the process is ended as represented by block 84. However, should the result of the comparison be a mismatch, the process proceeds along line 86 to block 88 where a central processor interrupt is generated and the method is then stopped as represented by block 90. Thus, as illustrated, a relatively simple method is provided for preventing the erroneous output of output words from the digital computer due to a hardware malfunction. The entire method is repeated each time an output word is retrieved from memory and attempted to be transferred from the digital computer via the output data transfer path of the digital computer.

Thus, it can be seen that it has been shown described a novel method and apparatus for preventing the erroneous output of data from a digital computer upon a hardware malfunction. It is to be understood that various changes, modifications and substitutions in the form and details of the described method and apparatus can be made by those skilled in the art without departing from the scope of the invention as described by the following claims.

What is claim is:

1. In a digital computer having an output word consisting of a key field and a data field, an apparatus for protecting against the erroneous transfer of said data field from said digital computer, comprising:
 (a) means for comparing a predetermined lock value with a key value contained in said key field of said output word, said means for comparing being capable of indicating either a first or second condition depending upon the comparison of said lock value and said key value;
 (b) means for tranferring said data field of said output word from said digital computer; and
 (c) means for inhibiting said transfer of said data field of said output word when said means for comparing indicates said first condition but not inhibiting said transfer when said means for comparing indicates said second condition.

2. An apparatus as in claim 1 having a central processor section, said apparatus further including means for alerting said central processor section of said digital computer when said means for comparing indicates said first condition, but not alerting said central processor section of said digital computer when said means for comparing indicates said second condition.

3. An apparatus as in claim 1 having an output data transfer path, wherein the means for transferring comprises a register having a load enable input, said register being coupled into said output data transfer path.

4. An apparatus as in claim 3, wherein the lock value is held in a register coupled to said means for comparing.

5. An apparatus as in claim 3, wherein the means for inhibiting comprises a logical NAND circuit having a first and a second input and a single output, said first input of said logical NAND circuit being coupled to said means for comparing, said second input of said logical NAND gate connected to a timing signal and said output of said logical NAND circuit connected to said load enable input of said register.

6. An apparatus as in claim 5, wherein said logical NAND circuit contains a third input, said third input being connected to a means for disabling output data transfer path.

7. An apparatus for inhibiting the output transfer of data contained in certain output words from a digital computer comprising:
 (a) means for separating said output words into a key field and a data field for holding said data;
 (b) means for comparing a key value contained in said key field with a predetermined lock value for a match condition;
 (c) means for inhibiting said output transfer of said data field when said key value does not match said lock value.

8. In a digital computer having an output word consisting of a key field and a data field, a method for protecting against the erroneous transfer of said data field from said digital computer comprising the steps of:
 (a) obtaining one of said output words;
 (b) separating said output words into a key field and a data field;
 (c) comparing a key value contained in said key field with a predetermined lock value for a match condition;
 (d) inhibiting the transfer of said data field if a match condition does not exist; and
 (e) allowing the transfer of said data field if a match condition does exist.

* * * * *